US008688996B2

(12) United States Patent  (10) Patent No.: US 8,688,996 B2
Livesey  (45) Date of Patent: Apr. 1, 2014

(54) MULTIPAD ENCRYPTION

(75) Inventor: Michael Livesey, St Andrews (GB)

(73) Assignee: University Court of the University of St Andrews, St Andrews (GB)

( * ) Notice: Subject to any disclaimer, the term of this patent is extended or adjusted under 35 U.S.C. 154(b) by 282 days.

(21) Appl. No.: 13/002,311

(22) PCT Filed: Jul. 20, 2009

(86) PCT No.: PCT/GB2009/001800
§ 371 (c)(1), (2), (4) Date: Jan. 20, 2011

(87) PCT Pub. No.: WO2010/010336
PCT Pub. Date: Jan. 28, 2010

(65) Prior Publication Data
US 2011/0113254 A1    May 12, 2011

(30) Foreign Application Priority Data
Jul. 19, 2008 (GB) .................................. 0813298.7

(51) Int. Cl.
*H04L 9/32* (2006.01)
(52) U.S. Cl.
USPC .......................................... 713/176; 713/150
(58) Field of Classification Search
USPC .................................................. 713/176, 150
See application file for complete search history.

(56) References Cited

U.S. PATENT DOCUMENTS

| 5,748,782 | A  | * | 5/1998  | Ferreira et al. | 382/232 |
| 6,600,823 | B1 | * | 7/2003  | Hayosh | 380/51 |
| 6,931,543 | B1 | * | 8/2005  | Pang et al. | 713/193 |
| 7,028,184 | B2 | * | 4/2006  | Hind et al. | 713/170 |
| 7,120,797 | B2 | * | 10/2006 | Wheeler | 713/176 |

(Continued)

FOREIGN PATENT DOCUMENTS

EP    1289186 A2    3/2003

OTHER PUBLICATIONS

A. Menezes et al., "Handbook of Applied Cryptography," 1996, CRC press, pp. 489-541.*

(Continued)

*Primary Examiner* — Luu Pham
*Assistant Examiner* — Sanchit Sarker
(74) *Attorney, Agent, or Firm* — W. Kevin Ransom; Moore & Van Allen PLLC

(57) ABSTRACT

A method for protecting a message or document. The method comprises encrypting the message using a first key associated with a first party; sending the encrypted message to a second party; encrypting the message using a second key associated with the second party, so that it is encrypted with two keys simultaneously; sending the encrypted message to the first party; decrypting the message using the first key; sending the message to the second party, the message being encrypted with the second key, and using the second key to decrypt the encrypted message, thereby exposing the original message.

29 Claims, 5 Drawing Sheets

(56) References Cited

U.S. PATENT DOCUMENTS

| | | | |
|---|---|---|---|
| 7,136,484 B1* | 11/2006 | Koh | 380/28 |
| 7,178,025 B2* | 2/2007 | Scheidt et al. | 713/168 |
| 7,188,364 B2* | 3/2007 | Volpano | 726/15 |
| 7,526,640 B2* | 4/2009 | Bazan Bejarano | 713/151 |
| 7,711,120 B2* | 5/2010 | Kimmel et al. | 380/279 |
| 7,958,057 B2* | 6/2011 | Al-Herz et al. | 705/69 |
| 8,489,885 B2* | 7/2013 | Wang et al. | 713/176 |
| 2003/0070080 A1* | 4/2003 | Rosen | 713/187 |
| 2003/0140235 A1* | 7/2003 | Immega et al. | 713/186 |
| 2004/0068648 A1* | 4/2004 | Lewis et al. | 713/153 |
| 2005/0074118 A1 | 4/2005 | Wilhite et al. | |
| 2007/0165859 A1* | 7/2007 | Scheidt et al. | 380/255 |
| 2007/0189531 A1* | 8/2007 | Lecomte et al. | 380/237 |
| 2008/0010461 A1* | 1/2008 | Holden et al. | 713/176 |
| 2009/0034722 A1* | 2/2009 | Zaharris et al. | 380/44 |
| 2010/0217987 A1* | 8/2010 | Shevade | 713/175 |
| 2011/0113254 A1* | 5/2011 | Livesey | 713/176 |

OTHER PUBLICATIONS

B. Libert et al., "Unidirectional Chosen-Ciphertext Secure Proxy Re-Encryption," Mar. 2011, IEEE Transactions on Information Theory, vol. 57, No. 3 pp. 1786-1802.*

S. De Capitani di Vimercati et al."Encryption Policies for Regulating Access to Outsourced Data," Apr. 2010, ACM Transactions on Database Systems, vol. 35, No. 2, Article 12.*

"Chapter 12: Key Establishment Protocols ED—Menezes, A; Oorschot, Van P.; Vanstone, S." [Online] Oct. 1, 1996, [CRC Press Series on Discrete Mathematics and Its Applications], pp. 489-541, XP0011525012; ISBN: 9780849385230.

International Search Report for PCT/GB2009/001800 dated Feb. 17, 2010.

* cited by examiner

MULTIPAD ENCRYPTION

FIELD OF THE INVENTION

The present invention relates to a system and method for encrypting electronic documents, messages and/or communications.

BACKGROUND OF THE INVENTION

With the prevalence of electronic communications continuing to increase, so do concerns about security. To address possible security issues, encryption techniques are often used, all of these using keys at one level or another. Whilst many known encryption techniques are highly effective, they are either very complex or they require the encryption keys to be exchanged at some stage in order to allow the person receiving a message encrypted by one party to decrypt and thereby read that message. In many systems, the key exchange process is vulnerable to attack by a hacker. Hence, there is a need for a simple yet effective technique for encrypting a message that does not require keys to be exchanged between parties prior to a communication being sent.

SUMMARY OF THE INVENTION

According to one aspect of the invention, there is provided an encryption/decryption technique comprising encrypting a message with two keys, one associated with a first party or device and one associated with a second party or device; decrypting the message using the key of the first party or device, and subsequently decrypting the message using the key of the second party or device. Preferably, the keys are randomly generated.

By ensuring that the message is always encrypted with at least one key, neither the message nor any of the keys has to be exchanged in unencrypted form, thereby increasing security in a simple and effective manner.

The message may be encrypted first using the key of the first party or device and then made available to be encrypted using the key of the second party or device, so that is it encrypted using both keys.

The message may be encrypted first using the key of the first party or device; sent to the second party or device and encrypted using the key of the second party or device, so that it is encrypted using both keys.

The doubly encrypted message may be sent from the second party or device to the first party or device; decrypted using the key associated with the first party or device and sent to the second party or device.

The doubly encrypted message may be sent from the second party or device to the first party or device; decrypted using the current key associated with the first party or device; encrypted using another key associated with the first party or device and sent to the second party or device where it may be decrypted using the current key of the second party; encrypted using another key associated with the second party or device and sent to the first party or device.

The method may involve repeating the steps of decrypting using the current key of one party and encrypting using another key of the same party.

The method may involve decrypting the message using the current key associated with the first party and sending to the second party the resultant message encrypted using the current key of the second party, and decrypting the message using the current key of the second party.

In its simplest form, the encryption technique of the invention comprises encrypting the message with a first key associated with the first party to produce a first cyphertext; encrypting the first cyphertext with a second key associated with the second party to produce a second cyphertext; decrypting the second cyphertext using the first key to produce a third cyphertext, and decrypting the third cyphertext using the second key. In this way, the plaintext message is exposed without having to transfer or exchange the keys and/or the message in unencrypted form.

To increase security, the basic encryption technique may be repeated multiple times using different keys associated with each party. For example, the technique may comprise replacing the keys of the first and second parties with other keys associated with those parties and repeating this a number of times, until it is determined that the number of repetitions is completed, at which stage the message is decrypted using the current key of the first party, and subsequently decrypted using the current key of the second party. The number of repetitions may be determined on-the-fly.

According to another aspect of the invention, there is provided an encryption/decryption device adapted to: encrypt a message or document using a first key; recognize or detect simultaneous encryption of the same message or document with the first key and a second key; and decrypt the encrypted message or document using the first key, thereby to allow decryption using the second key.

The device may be adapted to encrypt the encrypted message using a third key, so that the message is encrypted using the second key and the third key.

The device may be adapted to send the encrypted message to another device, and subsequently receive the message encrypted using a further key.

The keys may be independent of one another. Additionally or alternatively at least one of the keys may be randomly generated. All of the keys may be randomly generated.

According to yet another aspect of the invention, there is provided an computer program product having code or instructions for: encrypting a message using a first key; recognizing or detecting encryption of the same message using a second key, the message being encrypted with both the first and second keys; and decrypting the encrypted message using the first key, thereby to allow decryption of the message using the second key.

The computer program product may have code or instructions for: encrypting the encrypted message using a third key, so that the message is encrypted using the second key and the third key.

The computer program product may have code or instructions for sending the encrypted message to another device, and subsequently receiving the message encrypted using a further key.

The keys may be independent of one another. Additionally or alternatively at least one of the keys may be randomly generated. All of the keys may be randomly generated.

According to still another aspect of the invention, there is provided a mobile device, for example a mobile telephone, which includes an encryption/decryption device or computer program product of the preceding aspects of the invention.

According to still a further aspect of the invention, there is provided method for digital authentication using random digital signatures, the method comprising a sender randomly generating a digital signature and associating that signature uniquely with a receiver; and a receiver using that signature as authentication of the sender.

The method may involve storing the randomly generated digital signature and providing it only to the uniquely associated receiver for use thereby. The randomly generated digital signature may be deleted after it is provided to the uniquely associated receiver.

BRIEF DESCRIPTION OF THE DRAWINGS

Various aspects of the present invention will now be described by way of example only and with reference to the accompanying drawings, of which.

DETAILED DESCRIPTION OF THE DRAWINGS

The present invention provides a method for securing communications between two parties without requiring the transfer of an encryption key between the parties. The method involves exchanging a message between the two parties, wherein in a first exchange the message is encrypted using a key associated with a first party; in later exchanges (one or more) the message is encrypted by two keys at the same time, one of the two keys being associated with the first party and the other associated with the second party, and then in a final exchange the message is encrypted using a single key associated with the second party. In this way, the second party can expose the message and no key has to be transferred between the parties.

Figure 1:
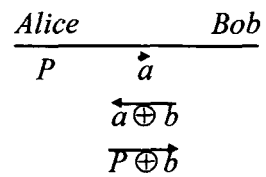
FIG. 1 is flow diagram of the basic encryption technique.

FIG. 1 shows the basic steps in the encryption technique in which the invention is embodied. Firstly, in order to engage in a secure communication, Alice chooses a random digital key or pad a, and Bob chooses a random digital key or pad b. These keys a and b are private to Alice and Bob respectively. Alice applies pad a to a plaintext message using a simple reversible XOR operation to produce a cyphertext. Alice sends her cyphertext message to Bob, who encrypts it with b, again using an XOR operation and returns it to Alice. Alice then decrypts the message she receives using a, and sends the result to Bob. This cyphertext can now be decrypted using b to reveal Alice's original plaintext message. In this way, there is provided a very simple and effective technique for encrypting a message without requiring an exchange of keys. Of course, this technique depends on an essential property of the encryption operation, which is that multiple encryptions are mutually independent.

As with many encryption methods, the basic form of the invention shown in FIG. 1 may be susceptible to eavesdropping. For example, if Jim Hacker, who knows the encryption protocol, managed to tap all three transits he could then combine them to reveal the plaintext. This is because each pad has been used twice and the second use cancels the first in the overall combination. Varied routing of each transit or of their component packets may reduce this vulnerability to a pragmatically acceptable level. Alternatively, the technique shown in FIG. 2 could be used.

Figure 2:
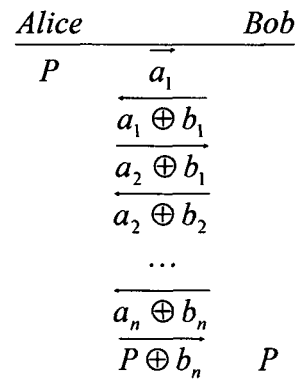
FIG. 2 is a flow diagram of an enhancement to the technique of FIG. 1.

FIG. 2 illustrates an encryption technique based on that of FIG. 1, but which involves replacing the keys $a_1$, and $b_1$ with other keys associated with Alice and Bob and repeating this a pre-determined number of times, until it is determined that the number of repetitions is completed, at which stage the message is decrypted using Alice's current key, and subsequently decrypted using Bob's current key. More specifically, when Bob returns the message with his own key $b_1$, Alice replaces her key $a_1$ with a different one $a_2$ and sends the new cyphertext to Bob, whereupon he replaces his key $b_1$ with a different one $b_2$ and sends the cyphertext back to Alice again, and so on. Each pad $a_i$, $b_i$ is replaced with pad $a_{i+1}$, $b_{i+1}$ by XORing with $a_i \oplus a_{i+1}$ or $b_i \oplus b_{i+1}$. Eventually Alice, on receipt of the latest version of the cyphertext, removes her current key and the exercise completes as in the original scenario. Because a hacker must tap every transit to obtain the plaintext, this iterated form of the invention of FIG. 2 effects an improvement. No subset will suffice. By making the number of repetitions large enough, the risk of a hacker tapping all transits can be reduced to the required level. This gives the scheme a very direct security/cost trade-off.

Figure 3:
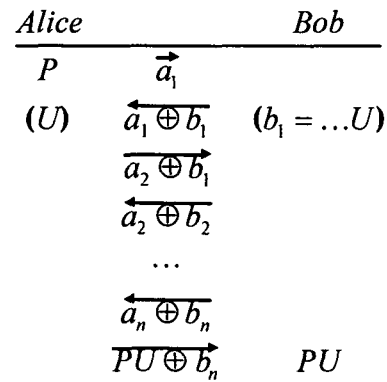
FIG. 3 is a flow diagram of an enhancement to the technique of FIG. 2.

In practice, and as described above the number of iterations used in the process of FIG. 2 could be hard-wired into the protocol. However, this means that a hacker could establish its value. This increases vulnerability in that the hacker then knows what he has to do, even if doing it is no easier. As an alternative, the number of iterations could be determined on the fly. The problem then is one of how to ensure that Bob knows when the iterations are completed, without Alice having to transmit information to this effect. This can be achieved using a simple form of PIN. FIG. 3 shows a technique for doing this. As before, the plaintext message P is firstly encrypted with $a_1$, typically using an XOR operation. In this case, $a_1$ is selected to have the same number of bits as P, so that the first cipher also has the same number of bits as P. The first cipher is sent to Bob, who generates $b_1$ to be u bits longer than the plaintext message P. Once this is done, the u-tail, U, is noted and stored by Bob. Then the first cipher is XORed with $b_1$ and sent to Alice.

On receipt of $a_1 \oplus b_1$, Alice XORS it with $a_1$, to get $b_1$, and therefrom U. In practice, because $a_1$, was originally the same length as P, whereas $a_1 \oplus b_1$ is longer by u bits, $a_1$ would have to be extended or "padded" to be the same length as $b_1$. This could be done by including zeros in $a_1$. Once tail U is identified, it is stored by Alice for use later. The protocol of FIG. 2 then operates on the message PU, as shown in FIG. 3. At this stage, the pads used by Alice have to be generated to be the same length as the pads for Bob. The process is iterated as many times as deemed necessary by Alice. The number of iterations could be generated using a random number processor or could merely be selected by Alice. Each time a cipher is received by Bob, it is decrypted using Bob's last pad and the decrypted cipher is checked to determine whether it includes U. In the event that it does not, the cipher is encrypted using Bob's new pad and returned to Alice. Once the desired number of iterations is completed, Alice decrypts the latest version of the cipher using her current pad $a_n$. This reduces the cipher to PU XORed with Bob's current pad $b_n$. The presence of U indicates that there will be no further iterations and that the decrypted message includes P. When this is received, Bob recognizes the tail as U and knows that this is flagging the presence of the plaintext P and no further iterations are needed. If Bob always XORS with his previous pad before encrypting with his next pad, he will discover PU provided that no previous transits had U as their u-tail. This can be ensured simply by Alice regenerating each prospective pad $a_j$, until its u-tail is not U. Indeed, if u is at least 64 (say), the probability that any random pad has u-tail U is vanishingly small.

Figure 4:
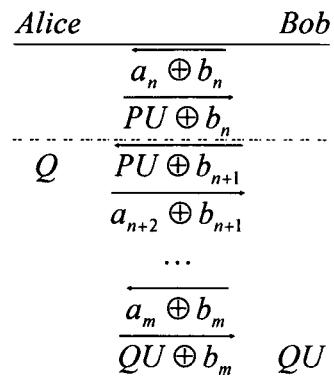
FIG. 4 is a flow diagram of steps taken to send a packet Q, after completion of the steps of FIG. 3.
Figure 5:
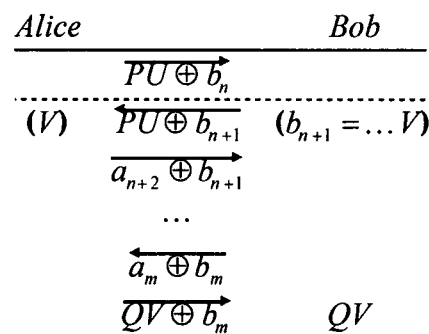
FIG. 5 is a flow diagram of a modified version of the technique of FIG. 4.

Now consider how to encrypt the next packet, Q, which Alice sends to Bob. One option is for the whole protocol to start over. A more secure option is to treat PU as being $a_{n+1}$, and continue the sequence as shown in FIG. 4. It would also improve security to use a different tail rather than reuse U. For a new tail of the same width, this is easily achieved by using $b_{n+1}$ to specify the new tail, V, exactly as $b_1$ specified U, as shown in FIG. 5. Although it is possible to continue the protocol in this way if the packet width changes, it is also possible to use it when it remains constant. The initial transit $\vec{a}_1$ can be thought of as opening a channel. Then restarting the protocol closes that channel and opens a new one, while continuing just keeps the same channel open. The decision about which is to occur after a given packet is most appropriately made by Alice and conveyed in the packet itself, rather than as a further ramification of the protocol.

Figure 6:
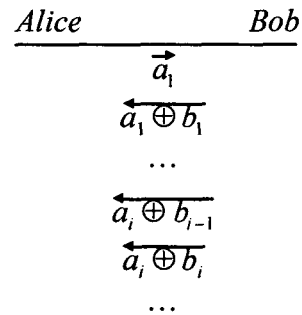
FIG. 6 shows a sequence of cascading points.
Figure 7:
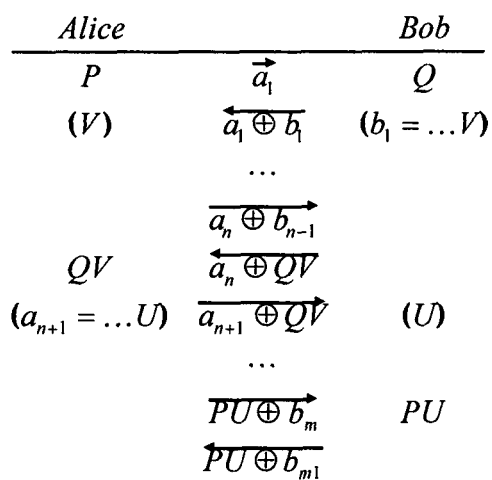
FIG. 7 is a flow diagram of a half duplex communication.

In practice it may be preferable for various reasons to treat the two directions of communication between Bob and Alice entirely separately. But the protocol itself is not limited to simplex communication. In an ongoing sequence of cascading pads, as shown in FIG. 6, then any of these can carry information, either a new tail or an actual packet, although at most one pad in any given transit should code information, otherwise the transit content is not random. All that is needed is a means of discriminating the possibilities. Since the current tail will identify the next packet, it remains only for the protocol to specify which pads define a new tail. It is not even necessary to say which direction the next packet will travel. Suppose $b_1$ defines the first tail, as before, while each subsequent new tail is defined by the transit immediately following a packet, i.e. by the recipient pad in the transit that returns that packet. FIG. 7 shows an example of a half-duplex communication, with Bob sending the first packet Q even though Alice opens the channel.

The encryption/decryption techniques described herein are well suited to implementation in hardware within a mobile device. For example, the techniques could be implemented using a random pad generator (RPG) and an XOR bitwise operation. The RPG can provide true physical randomness by exploiting quantum level behavior. Also, it has no stored keys, instead keys are generated for one time use as and when needed and so no physical protection is required. This means that the encryption/decryption device can be on a separate chip because a pin boundary, a security weakness for stored key systems, is not an issue.

Figure 8:
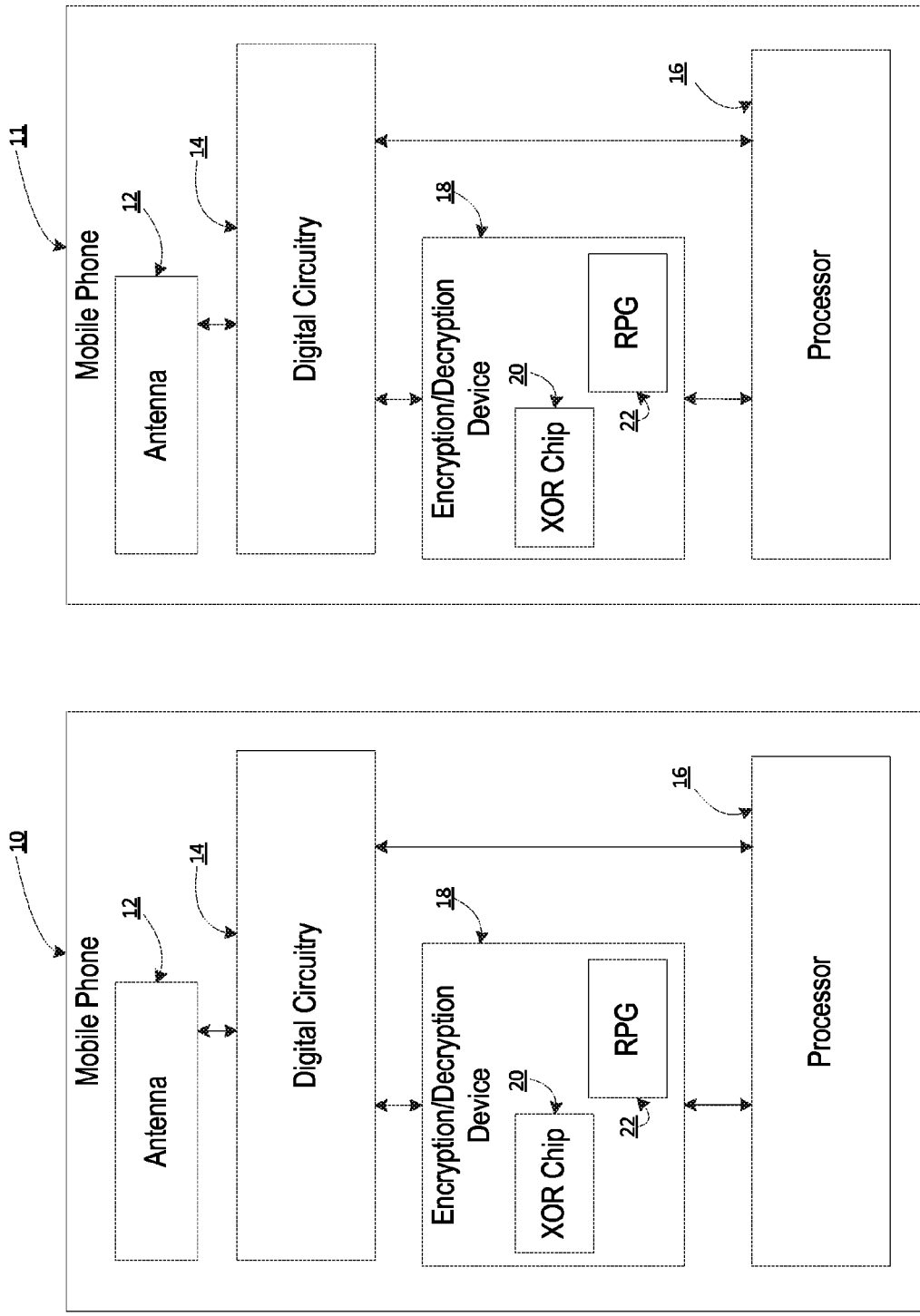
FIG. 8 is a block diagram of a mobile phone that is adapted to implement the encryption technique.

FIG. 8 shows a schematic representation of two mobile phones 10 and 11. As conventional, each has an antenna 12 for receiving and transmitting electromagnetic signals. Associated with the antenna 12 is analogue to digital circuitry 14 for converting received analogue signals to digital signals for processing by an on-board processor 16, and for converting digital signals from the processor 16 to analogue signals for transmission.

Connected between the analogue to digital circuitry 14 and the processor 16 is an encryption/decryption device 18. This has an XOR chip 20 and a random pad generator (RPG) 22 for randomly generating one or more encryption keys. Also provided is a mask (not shown). This is used to select a sub-set of bits of the data unit received for encryption. In this way, the encryption can be dynamically tailored to apply to the data from a higher level in the protocol stack, leaving all lower level protocol bits in clear. Whilst physically in the path of the lowest level data units, the device can sit logically higher up the protocol stack. This means that the fixed physical position of the device out with the application processor is not a barrier to using it as flexibly as a software encryption technique.

In use, the processor 16 processes a message that is to be sent from the mobile phone 10. If encryption is not required, the message is passed directly to the digital circuitry 14 for transmission via the antenna. If encryption is required, the message is passed to the encryption/decryption device 18, where receipt of the data triggers the RPG 22 to generate a key. The data is then XORed with the logical AND of the random pad (RP) and the mask, so that selected bits are encrypted. The key is saved temporarily in memory (not shown). If multiple packets (messages) are being processed at once multiple key storage must be available and each key would have to be tied to its corresponding packet in some way, for example via their respective buffer positions. Beyond that no special message ID is needed (though there may be IDs associated with the higher levels of protocol embedded in the packet).

Although the pad needs to be stored temporarily, the difference from an actual "stored key" system is that discovering the pad compromises only the current message, not the whole encryption mechanism. Of course, an adversary might get a permanent tap into the phone innards to snoop every pad. But the plaintext message has to be stored somewhere, so in that case they could probably directly snoop the plaintext message buffer anyway.

The encrypted data is then sent to the second device 11, in this example another mobile telephone. Once processed by the analogue to digital circuitry 14 of the second device 11, the received encrypted message is passed to the encryption/decryption device 18 where another key is generated. The data is then XORed with the logical AND of the random pad (RP) and the mask, so that selected bits are encrypted. This second key is saved temporarily in the second device 11. The message is now simultaneously encrypted using both the key generated in the first device and the key generated in the second device. The doubly encrypted data is then sent to the first device where it is decrypted using the first encryption/decryption device using the first stored key and mask. After this, the first key is deleted from the first encryption/decryption device 18 and the data retuned to the second device 11 where it is decrypted using the second stored key, thereby exposing the original message. In this way, a mobile-to-mobile message can be protected without requiring the transfer of an encryption key.

The padlock protocol described above may be vulnerable to attacks such as impersonation, hostage-taking and tampering. For the latter two it is no more vulnerable than public-key protocols. Although these are also vulnerable to impersonation, they are rather less so because the attack can only be mounted via the database of public keys. An adjunct to the invention is the notion of a disposable PIN for improving its impersonation-resistance. To implement this, a central server holds a lookup table of randomly generated bit sequences (the PINs). Each PIN has an associated client of the system who is its owner. When Alice first uses the system, she is issued with a set of PINs. These are all entered into the PIN table with Alice as their owner. The PINs are disposable because whenever one is used the server immediately deletes it from the PIN table.

To identify herself to the server, Alice simply presents it with a PIN. The server accepts her identity provided that the PIN is in the table with Alice as the recorded owner. In particular, Alice will identify herself in this way to replenish her stock of PINs from the server. She can do this at any time, but at the latest when she is down to her last PIN. To enable Bob to authenticate her, Alice randomly generates a signature pad or digital signature A. Alice primes the server that A is earmarked for Bob, and only Bob, to authenticate her. She then sends A to Bob. Bob can then authenticate Alice by presenting A to the server, along with his own identification.

Priming is needed to guard against the following impersonation ploy. Suppose Bob were not to use A for authentication (say already knowing that Alice is indeed she) but to keep it. He could then use it to impersonate Alice in a subsequent communication with Cyril. The earmarking of A by Alice for Bob prevents this by ensuring that A would be useless to Bob for impersonation, because Bob would have either: to re-prime A for Cyril, which he cannot without one of Alice's PINs; or give Cyril one of his own PINs so that Cyril can impersonate him to authenticate Alice, which would rather expose the fraud.

The communication protocol must specify how the signatures are to be passed, say by requiring one or more pads to contain a signature as a prefix or suffix. The simplest scheme has the first pad in each direction containing the sender's signature. However, this opens the possibility of Hacker, knowing the point at which authentication occurs, waiting until it is complete before proceeding to impersonate Alice. It is, therefore, preferable to use the duplex form of the protocol and treat the signatures as the first packets in each direction.

Figure 9:
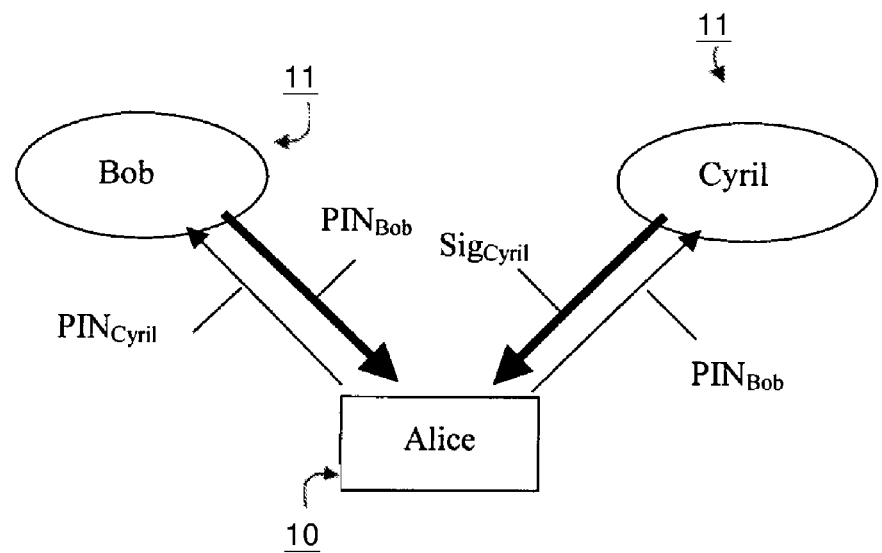
FIG. 9 is a block diagram of a multi-server arrangement that is adapted to provide cross validation of PINs or digital signatures.

The above techniques are highly effective, provided the integrity of the server can be preserved. Although it is impossible to guard against a deliberately malicious server, it is possible to guard against impersonation of the server. Clearly, a PIN from the server itself instills little confidence, but if its PIN were to be issued by a different server it can be authenticated like any ordinary client. So a more robust version of the scheme would use multiple servers that cross-validate each other. This is illustrated in FIG. 9, which shows Alice acting as the client for two servers Bob and Cyril. Here, the thick arrows indicate each server issuing Alice with a PIN, whilst the thin arrows show Alice validating each PIN against the other server. Whilst this does not protect against a malicious cartel, it provides reasonable protection against a hacker attempting to impersonate one of them.

Whilst the invention is described with reference to Alice and Bob, it will be appreciated that this is a standard representation used in the field of encryption and in practice computer based software and/or hardware would implement all of the processes described above, in particular the steps of receiving, encrypting and decrypting data, and any communication and/or processing techniques. Equally, although the text refers in some places first and second parties, it will be appreciated that this covers interactions between first and second devices.

A skilled person will appreciate that variations of the disclosed arrangements are possible without departing from the invention. For example, in the method described with reference to FIG. 3, although Bob generates the tail U at random and so this could be any length, instead the length of the tail could be set or determined prior to communications. Also, although FIG. 8 is described with reference to the method of FIG. 1, any of the other encryption techniques described above could be implemented. In addition, whilst FIG. 8 illustrates mobile to mobile communications, the encryption/decryption device of the invention could be used in any device, for example in a mobile telephone base station for encrypting protocol negotiations between mobiles and the base station. Accordingly the above description of the specific embodiment is made by way of example only and not for the purposes of limitation. It will be clear to the skilled person that minor modifications may be made without significant changes to the operation described.

The invention claimed is:

1. A method for encrypting a plaintext message, the method comprising:
   (a) encrypting a message using a first key associated with a first party or a first device, to obtain a first encrypted message;
   (b) sending, by the first device the first encrypted message to a second party or a second device;
   (c) receiving a second encrypted message that has been encrypted using a second key associated with the second party or the second device, wherein the second encrypted message has been encrypted using both the first and second keys;
   (d) decrypting the second encrypted message using the first key to obtain a third encrypted message that has been encrypted using the second key;
   (e) encrypting the third encrypted message using a third key associated with the first party or the first device to obtain a fourth encrypted message that has been encrypted using the second and third keys;
   (f) sending the fourth encrypted message to the second party or the second device;
   (g) receiving a fifth encrypted message that has been decrypted using the second key and encrypted by a fourth key associated with the second party or the second device, wherein the fifth encrypted message has been encrypted using the third and fourth keys;
   (h) decrypting the fifth encrypted message using the third key associated with the first party or the first device, to obtain a sixth encrypted message encrypted by the fourth key associated with the second party or the second device;
   (i) sending the encrypted plaintext message encrypted by the fourth key to the second party or the second device for decryption using the fourth key to obtain the plaintext message.

2. A method as claimed in claim 1 wherein the message is encrypted first using the first key associated with the first party or the first device and then the message is made available to be encrypted using the second key associated with the second party or the second device, so that is it encrypted using both the first and second keys.

3. A method as claimed in claim 1 comprising encrypting the message with a first key associated with the first party or the first device to produce a first cypher text; encrypting the first cyphertext with a second key associated with the second party or the second device to produce a second cyphertext; decrypting the second cyphertext using the first key to produce a third cyphertext, and decrypting the third cyphertext using the second key.

4. A method as claimed in claim 1 comprising replacing the keys of the first and second parties or the first and second devices with other keys associated with those parties and repeating operations (a)-(g), until it is determined that a number of repetitions is completed, at which stage the message is decrypted using a current key of the first party or the first device, and subsequently decrypted using a current key of the second party or the second device.

5. A method as claimed in claim 4 comprising determining the number of repetitions on-the-fly.

6. A method as claimed in claim 4 comprising using a marker to indicate to one party when the repetitions are completed.

7. A method as claimed in claim 1 wherein the keys are all independent of one another.

8. A method as claimed in claim 1 wherein at least one of the keys is randomly generated.

9. A method as claimed in claim 8 wherein all of the keys are randomly generated.

10. A method as claimed in claim 1 wherein the operations of (d) to (h) are repeated one or more times using different respective keys.

11. A method as claimed in claim 1 wherein the operations of (d) to (h) are repeated a pre-determined number of times using different respective keys.

12. A method as claimed in claim 11 wherein the pre-determined number of times is determined on-the-fly.

13. An encryption/decryption device for encrypting a plaintext message, the device comprising:
a memory device;
a communication device; and
a processing device operatively coupled to the memory device and the communication device, to perform the operations of:
(a) encrypting the message using a first key, thereby resulting in a first encrypted message;
(b) sending, by the first device the first encrypted message to a second party or a second device;
(c) receiving a third encrypted message that has been encrypted using a second key associated with the second party or the second device that has been party encrypted with both the first and second keys;
(d) decrypting the second encrypted message using the first key to obtain a third encrypted message that has been encrypted using the second key;
(e) further-encrypting the third encrypted message using a third key associated with the first party or the first device to obtain a fourth encrypted message that has been encrypted using the second and third keys;
(f) sending the fourth encrypted message to the second party or the second device;
(g) receiving a fifth encrypted message that has been decrypted using the second key and encrypted by a fourth key associated with the second party or the second device, wherein the fifth encrypted message has been encrypted using the third and fourth keys;
(h) decrypting the fifth encrypted message using the third key associated with the first party or the first device to obtain a sixth encrypted message that has been encrypted using the fourth key associated with the second party or the second device;
(i) sending the encrypted plaintext message encrypted by the fourth key to the second party or the second device for decryption using the fourth key to obtain the plaintext message.

14. An encryption/decryption device as claimed in claim 13 adapted to initiate secure communication with another device using the message encrypted using the first key; ensure that subsequent exchanges between it and the other device are encrypted using two current keys each associated with one of the devices, until the message is to be decrypted at which time the current key of the device is used to decrypt the message so that it is only encrypted using the current key of the other device and the message is made available for decryption using the current key of the other device.

15. An encryption/decryption device as claimed in claim 13 wherein the keys are all independent of one another.

16. An encryption/decryption device as claimed in claim 13 wherein at least one of the keys is randomly generated.

17. An encryption/decryption device as claimed in claim 16 wherein all of the keys are randomly generated.

18. An encryption/decryption device as claimed in claim 13 wherein the acts of (d) to (h) are repeated one or more times using different respective keys.

19. An encryption/decryption device as claimed in claim 13 wherein the acts of (d) to (h) are repeated a pre-determined number of times using different respective keys.

20. An encryption/decryption device as claimed in claim 19 wherein the pre-determined number of times is determined on-the-fly.

21. A computer program product for encrypting a plaintext message comprising at least one non-transitory computer-readable medium having code or instructions for:
(a) encrypting a message using a first key associated with a first party or a first device to obtain a first encrypted message;
(b) sending, by the first device the first encrypted message to a second party or a second device;
(c) receiving a second encrypted message that has been encrypted using a second key associated with the second party or the second device, wherein the second encrypted message has been encrypted using both the first and second keys;
(d) decrypting the second encrypted message using the first key to obtain a third encrypted message encrypted using the second key;
(e) encrypting the third encrypted message using a third key associated with the first party or the first device to obtain a fourth encrypted message that has been encrypted using the second key and the third key;
(f) sending the fourth encrypted message to the second party or the second device;
(g) receiving a fifth encrypted message that has been decrypted using the second key and encrypted by a fourth key associated with the second party or the second device, wherein the fifth encrypted message has been encrypted using the third and fourth keys;
(h) decrypting the fifth encrypted message using the third key associated with the first party or the first device to obtain a sixth encrypted message that has been encrypted using the fourth key associated with the second party or the second device;
(i) sending the encrypted plaintext message encrypted by the fourth key to the second party or the second device for decryption using the fourth key to obtain the plaintext message.

22. A computer program product as claimed in claim 21 wherein the keys are all independent of one another.

23. A computer program product as claimed in claim 22 wherein all of the keys are randomly generated.

24. A computer program product as claimed in claim 21 wherein at least one of the keys is randomly generated.

25. A computer program product as claimed in claim 21 wherein the acts of (d) to (h) are one or more times using different respective keys.

26. A computer program product as claimed in claim 21 wherein the acts of (d) to (h) are repeated a pre-determined number of times using different respective keys.

27. A computer program product as claimed in claim 26 wherein the pre-determined number of times is determined on-the-fly.

28. A mobile device for encrypting a plaintext message comprising:
a memory device;
a communication device; and
a processing device operatively coupled to the memory device and the communication device to perform the operations of:
(a) encrypting a message using a first key associated with the a first party or a first device to obtain a first encrypted message;

(b) sending, by the first device the first encrypted message to a second party or a second device;
(c) receiving a second encrypted message that has been encrypted using a second key associated with the second party or the second device, wherein the second encrypted message has been encrypted using both the first and second keys;
(d) decrypting the second encrypted message using the first key to obtain a third message encrypted using the second key;
(e) encrypting the third encrypted message using a third key associated with the first party or the first device to obtain a fourth encrypted message that has been encrypted using the second and third keys;
(f) sending the fourth encrypted message to the second party or the second device;
(g) receiving a fifth encrypted message that has been decrypted using the second key and encrypted by a fourth key associated with the second party or the second device, wherein the fifth encrypted message has been encrypted using the third and fourth keys;
(h) decrypting the fifth encrypted message using the third key associated with the first party or the first device to obtain a sixth encrypted message that has been encrypted using the fourth key associated with the second party or the second device;
(i) sending the encrypted plaintext message encrypted by the fourth key to the second party or the second device for decryption using the fourth key to obtain the plaintext message.

29. A mobile device for encrypting a plaintext message comprising:
   a memory device;
   a communication device;
   a processing device operatively coupled to the memory device and the communication device; and
   at least one non-transitory computer-readable medium stored in said memory device, said computer-readable medium having code or instructions for:
   (a) encrypting a message using a first key associated with a first party or a first device to obtain a first encrypted messagel
   (b) sending, by the first device the first of encrypted message to a second party or a second device;
   (c) receiving a second encrypted message that has been encrypted using a second key associated with the second party or the second device, wherein the second encrypted message has been encrypted using both the first and second keys;
   (d) decrypting the second encrypted message using the first key to obtain a third encrypted message that has been encrypted using the second key;
   (e) encrypting the third encrypted message using a third key associated with the first party of the first device to obtain a fourth encrypted message that has been encrypted using the second key and the third key;
   (f) sending the fourth encrypted message to the second party or the second device;
   (g) receiving a fifth message that has been decrypted using the second key and encrypted by a fourth key associated with the second party or the second device, wherein the fifth encrypted message has been encrypted using the third and fourth keys;
   (h) decrypting the fifth encrypted message using the third key associated with the first party or the first device to obtain a sixth encrypted message that has been encrypted by the fourth key associated with the second party or the second device;
(i) sending the encrypted plaintext message encrypted by the fourth key to the second party or the second device for decryption using the fourth key to obtain the plaintext message.

* * * * *